Oct. 18, 1932.  C. L. EKSERGIAN  1,883,641
DUAL DISK WHEEL WITH SPACER RINGS
Filed March 11, 1931
FIG.1
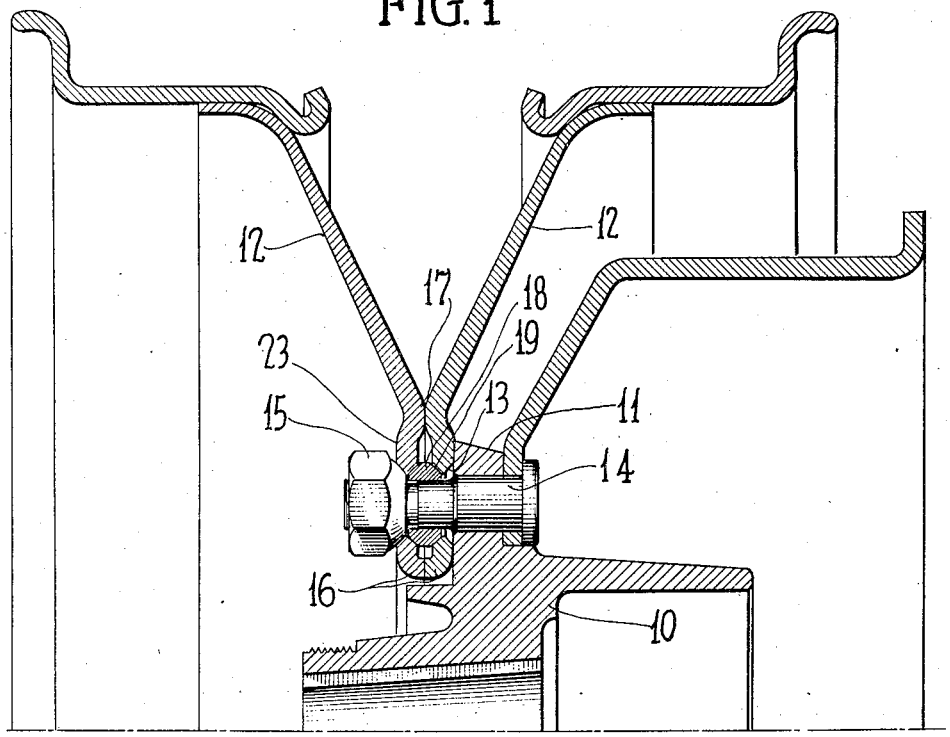
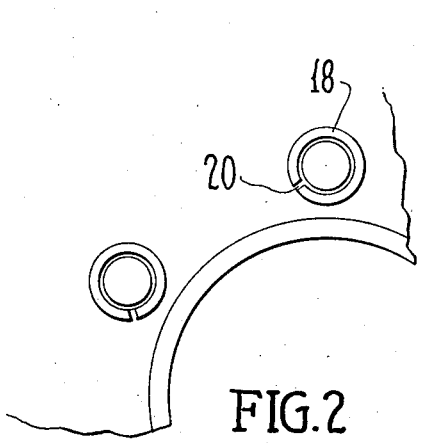
FIG.2
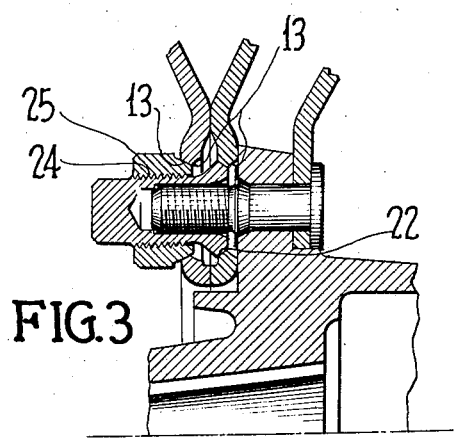
FIG.3
*INVENTOR.*
Carolus L. Eksergian
BY
*ATTORNEY.*

Patented Oct. 18, 1932

1,883,641

UNITED STATES PATENT OFFICE

CAROLUS L. EKSERGIAN, OF DETROIT, MICHIGAN, ASSIGNOR TO BUDD WHEEL COMPANY, OF PHILADELPHIA, PENNSYLVANIA, A CORPORATION OF PENNSYLVANIA

DUAL DISK WHEEL WITH SPACER RINGS

Application filed March 11, 1931. Serial No. 521,621.

My invention relates to the art of dual wheels and it has been my particular object to devise a dual wheel mounting affording both strength and resilience at a very slight expense. Further objects achieved by my invention relate to the provision of simple and inexpensive means for securing an inner disk in properly centered and clamped relationship with respect to the hub and bolts without the use of inner securing nuts.

Other objects and advantages of my invention will be apparent from a reading of the sub-joined specification in the light of the attached drawing, in which, Figure 1 is a central axial sectional view through my improved wheel.

Figure 2 is a detail side elevation of the central portion of my wheel with the inner disk, studs and resilient rings in place but with the nuts and outer disk removed.

Figure 3 is a detail central axial section through the nave portion of my wheel illustrating a slight modification.

Referring to the drawing by reference characters, the numeral 10 indicates a hub of a vehicle provided with radially extending flange 11 adapted to receive a vehicle wheel upon its outer face. The wheel body in the present instance, consists of a pair of duplicate dual disks 12 and these disks are provided with coined openings 13 in their inner and outer faces which are adapted to receive the securing nuts 15 which coact with bolts 14 projecting outwardly from a hub flange. Conical faces on the inner ends of the nuts thus seat against the coined portions of the outer disk and secure the disks in place.

The wheel bodies have their inner radial extremities inturned as indicated at 16 and extend radially outwardly from these inturned portions in substantially plane portions 23 which extend to a zone slightly beyond the periphery of the hub flange. These plane portions terminate in sharply ribbed portions 17. Flanges 16 and the ribs 17 on the complemental disks are adapted to abut in annular zones when the nuts are brought home to secure the disks in place upon the hub flange.

In order to properly center the two disks upon the hub flange, I have provided a plurality of spaced split rings 18 which are adapted to be received upon the respective studs. These rings are provided with coined ends 19 adapted to abut the conical seats on the inner face of the outer disk and the outer face of the inner disk, and thus accurately center these disks upon the studs. These rings also serve to act as limiting stops in the approach of the nave portions 23 of the disks after the ribs 17 and flanges 16 have come into abutment with each other. The rings are split as indicated at 20 and these split portions are drawn together by the resilient approach of the wheel parts under the action of the securing nuts, hugging the studs 14 in their collapsed condition.

It will be obvious that I have devised a mounting which avoids the necessity for inner securing nuts and yet acts to both center the disks and limit their resilient approach. Since these centering and movement limiting rings are individual to the studs, they require but a small amount of material in their fabrication and thus constitute a very inexpensive accessory. The relative proportions of the parts are preferably such that the disks abut each other in the zones 16 and 17 before the rings 18 limit their relative approach altogether. This enables the nave portions to flex slightly after impingement of the zones 16 and 17, and thus stresses the nave portions of the disks and tends to cause them to yield resiliently and thus have the effect of lock washers in the securement of the nuts 15.

In Figure 3 I have illustrated a modification in which a series of inner nuts 21 are provided with coined seats 22 abutting against the coined outer edges of the inner disk. The shanks of these securing nuts pass through the bolt receiving openings of the outer disk and are provided with threaded portions 24 adapted to receive outer nuts 25 which are threaded thereon, and secure the outer disk in place in properly centered relationship.

Although I have illustrated but two modifications of my invention, other modifications will be obvious to those skilled in the art and I do not therefore wish to be limited except by the terms of my sub-joined claims as interpreted in the light of the generic spirit of my invention.

What I claim is:

1. A vehicle wheel including, in combination, a hub having a radially extending face, a pair of disk wheel bodies mounted against said face, each of said disk wheel bodies including a radially extending portion in its zone of attachment to the hub, an axially turned flange at the inner extremity of said radially extending portion and an axially turned rib at the outer extremity of said radially extending portion, said axially turned flanges extending into abutment with each other and said axially turned ribs extending into abutment with each other, securing means passing through said radially extending portion of said disks to hold them in assembled position upon said hub, and annularly spaced means for centering the inner disks upon the hub.

2. A vehicle wheel including, in combination, a hub having a radially extending face, a pair of disk wheel bodies mounted against said face, each of said disk wheel bodies including a radially extending portion in its zone of attachment to the hub, an axially turned flange at the inner extremity of said radially extending portion and an axially turned rib at the outer extremity of said radially extending portion, said axially turned flanges extending into abutment with each other and said axially turned ribs extending into abutment with each other, securing means passing through said radially extending portion of said disks to hold them in assembled position upon said hub, and annularly spaced means for centering the inner disk upon the hub and limiting the relative approach of the nave portions of said disks.

3. A vehicle wheel including, in combination, a hub having a radially extending face and a plurality of bolts extending outwardly from said face, a pair of disk wheel bodies mounted against said face, each of said disk wheel bodies including a radially extending portion provided with coined openings adapted to receive said bolts, an axially turned flange at the inner extremity of said radially extending portion and an axially turned rib at the outer extremity of said radially extending portion, said axially turned flanges extending into abutment with each other and said axially turned ribs extending into abutment with each other, a plurality of coined rings surrounding the bolts individually and interposed between said disks with their coined portions seating in the coined openings in the disks to center the same, and a plurality of nuts coacting with said bolts to clamp the disk wheel bodies against the hub.

4. A vehicle wheel including, in combination, a hub having a radially extending face, a pair of disk wheel bodies mounted against said face, each of said disk wheel bodies including a radially extending portion in its zone of attachment to the hub, an axially turned flange at the inner extremity of said radially extending portion and an axially turned rib at the outer extremity of said radially turned portion, said axially turned flanges extending into abutment with each other and said axially turned ribs extending into abutment with each other, and securing means passing through said radially extending portions of said disks to hold them in assembled position upon said hub.

In testimony whereof I hereunto affix my signature.

CAROLUS L. EKSERGIAN.